US006757099B2

(12) United States Patent
Pavel et al.

(10) Patent No.: US 6,757,099 B2
(45) Date of Patent: Jun. 29, 2004

(54) OPTICAL POWER TRANSIENT CONTROL SCHEME FOR EDFA AMPLIFIERS

(75) Inventors: Lacra Pavel, Ottawa (CA); Xiaona Meng, Ottawa (CA)

(73) Assignee: PTS Corporation, San Jose, CA (US)

( * ) Notice: Subject to any disclaimer, the term of this patent is extended or adjusted under 35 U.S.C. 154(b) by 0 days.

(21) Appl. No.: 09/930,367

(22) Filed: Aug. 15, 2001

(65) Prior Publication Data

US 2003/0035206 A1 Feb. 20, 2003

(51) Int. Cl.[7] ................................................ H04B 10/12

(52) U.S. Cl. .............................. 359/341.4; 359/337.11; 359/337.4; 359/341.41; 359/341.42; 359/341.43

(58) Field of Search ......................... 359/337.11, 337.4, 359/341.4–341.43

(56) References Cited

U.S. PATENT DOCUMENTS

| | | | |
|---|---|---|---|
| 5,852,510 | A | 12/1998 | Meli et al. |
| 5,907,429 | A | 5/1999 | Sugata |
| 5,995,274 | A | 11/1999 | Sugaya et al. |
| 6,038,063 | A | 3/2000 | Tsuda et al. |
| 6,078,422 | A | 6/2000 | Kosaka et al. |
| 6,091,539 | A | 7/2000 | Kosaka |
| 6,215,584 | B1 | 4/2001 | Yang et al. |
| 6,246,514 | B1 | 6/2001 | Bonnedal et al. |
| 6,307,670 | B1 | 10/2001 | McNamara |
| 6,313,940 | B1 | 11/2001 | Bode et al. |
| 2001/0043389 | A1 | 11/2001 | Bonnedal et al. |
| 2001/0046083 | A1 | 11/2001 | Akasaka et al. |
| 2001/0050802 | A1 | 12/2001 | Namiki et al. |
| 2001/0050807 | A1 | 12/2001 | Deguchi et al. |

FOREIGN PATENT DOCUMENTS

| | | |
|---|---|---|
| EP | 1079481 A2 | 2/2001 |
| WO | WO 00/04656 | 1/2000 |

*Primary Examiner*—Thomas G. Black
*Assistant Examiner*—Stephen Cunningham
(74) *Attorney, Agent, or Firm*—Harness, Dickey & Pierce, P.L.C.

(57) ABSTRACT

An improved optical power transient control scheme is provided for optical amplifiers used in long haul, high capacity DWDM optical networks. The optical power transient control scheme employs a combination of feed-forward and feedback control mechanisms to adjust the pump laser current of an amplifier. In this way, the optical power transient control scheme allows for very fast detection of transient changes in optical input power and fast control settling time with minimal optical power degradation.

2 Claims, 2 Drawing Sheets

10
32
12
34
20
36
22
16
38
1
2
3
4
$L_{VOA}$
$L_{GFF}$
Pump Laser
Pump Laser
$K_{ffw1}$
$K_{ffw2}$
$K_{fbk2}$
$u0_{p1}$
$u0_{p2}$
14
18
Gain Reference

OPTICAL POWER TRANSIENT CONTROL SCHEME FOR EDFA AMPLIFIERS

FIELD OF THE INVENTION

The present invention relates generally to a method for controlling optical gain of an optical amplifier and, more particularly, to an optical power transient control scheme for erbium-doped fiber amplifiers (EDFA) used in long haul, high capacity dense wavelength division multiplexing optical networks.

BACKGROUND OF THE INVENTION

EDFA amplifiers are used to compensate for the accumulated loss of various optical elements across an optical network and for the transmission loss across the optical fiber. These optical fiber amplifiers are operated at saturation such that the total optical output power is nearly constant independent of the number of wavelength channels present. If not controlled, the gain experienced by each channel will vary depending on the number of channels present.

Upon network reconfiguration, when wavelength channels are added or dropped or when the fiber is unexpectedly cut, sudden changes in the total input power are effected. Due to transient cross saturation in EDFA optical amplifiers, this sudden total power change induces power excursions on the surviving channels that can adversely affect the quality of service. Although this transient perturbation is generally slow in a single amplifier, the magnitude and speed of the transient power excursions accumulates as it passes through from stage to stage and grows quickly along a cascade of EDFA amplifiers. Surviving channel power variations can lead to unacceptable error bursts, due to exceeding the threshold for optical nonlinear effects, or, due to the receiver inability to handle such rapidly changing power levels.

Therefore, it is desirable to provide a method of electronically controlling the optical gain of an EDFA amplifier that will counteract the effect of sudden optical power change. This distributed control action across all of the optical amplifiers in the system together with optimized control performance will allow for very long chains of amplifiers in optical networks with dynamic wavelength provisioning. It is envisioned that the proposed control scheme will allow for very fast detection of transient changes in input optical power, as well as fast control settling time with minimal optical power degradation on the surviving channels. In addition, the proposed control scheme should be adaptable to specific optical network configurations and to handle unexpected add/drop in optical power.

SUMMARY OF THE INVENTION

In accordance with the present invention, an improved method is provided for electronically controlling an optical amplifier in an optical network. The method includes: receiving an optical signal into the optical amplifier; detecting input power of the optical signal entering the amplifier; supplying optical energy to the at least one doped fiber section associated with the optical amplifier using a laser source; detecting a sudden variation in the input power; and controlling the optical energy supplied by the laser source based only on the variation of the input power of the optical signal entering the amplifier.

In another aspect of the present invention, an alternative improved method is provided for electronically controlling the optical gain of an optical amplifier in an optical network. The method includes: receiving an optical signal into the optical amplifier; detecting output power of the optical signal at an output of a first doped fiber section, where the output of the first doped fiber section is connected to an input of a second doped fiber section; supplying optical energy to the second doped fiber section using a second laser source; and controlling the optical energy supplied by the second laser source based in part on the optical power detected at the output of the first doped fiber section.

For a more complete understanding of the invention, its objects and advantages, reference may be had to the following specification and to the accompanying drawings.

DETAILED DESCRIPTION OF THE PREFERRED EMBODIMENTS

Figure 1:
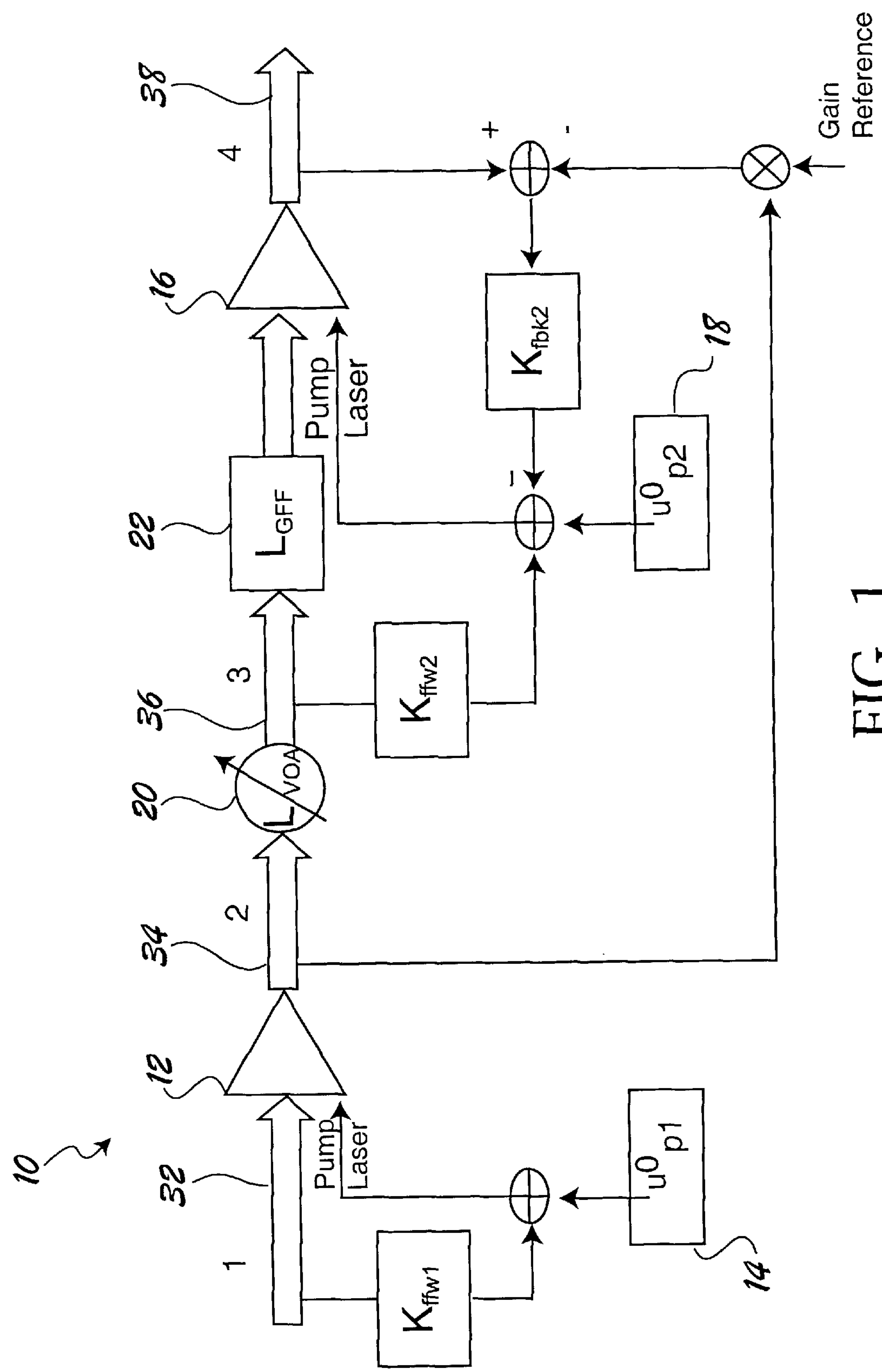
FIG. 1 is a block diagram of a preferred embodiment of an optical amplifier control system in accordance with the present invention.

FIG. 1 illustrates an optical power transient control scheme 10 for an optical amplifier in an optical network. In this example, the control scheme is applied to an erbium-doped fiber amplifier (EDFA). EDFA amplifiers used in high performance optical networks typically employ two or more erbium-doped fiber sections which are commonly referred to as "coils". The gain of the different coils is distributed such that optimized performance is achieved with respect to noise and design gain flatness as is well known in the art. While the following description is provided with reference to a control scheme for EDFA amplifiers, it is readily understood that the broader aspects of the present invention are also applicable to other types of optical amplifiers (e.g., praseodymium-doped fiber amplifiers).

The EDFA amplifier preferably employs a first coil 12 and a second coil 16 for amplifying optical signals therein. The split/combine coil control feature enables high accuracy control, maintenance of an optimized EDFA noise figure, as well as adaptability to handle scalable EDFA amplifier designs. The split/combine feature also facilitates the use of coil gain control design which in turn enables simultaneous disturbance rejection and reference tracking such that an overall optimized performance of amplifier is maintained. It is to be understood that the control scheme of the present invention is readily extendable to optical amplifiers having three or more coils.

Referring to FIG. 1, a first pump laser 14 is connected to the first coil 12, and a second pump laser 18 is connected to the second coil 16. The first pump laser 14 and the second pump laser 18 are both operable to supply optical energy to the first coil 12 and the second coil 16, respectively, as is well known in the art. A variable optical attenuator 20 may be connected between the output of the first coil 12 and the input of the second coil 16 to control the flatness of the amplifier. In addition, a gain-flattening optical filter 22 may be connected between the output of the variable optical attenuator 20 and the input of the second coil 16. Although this EDFA amplifier configuration is presently preferred, it is envisioned that other amplifier configurations are also within the scope of the present invention.

The optical power transient control scheme 10 employs a combination of feed-forward and feedback control mechanisms to adjust the pump laser current in the amplifier. In order to implement feed-forward and feedback control mechanisms, photodetectors are used to measure the optical power of the signal at different points within the amplifier. For instance, a first photodetector 32 is positioned at the input of the first coil 12 and a second photodetector 34 is positioned at the output of the first coil 12. Likewise, a third photodetector 36 is positioned at the input of the second coil 16 and a fourth photodetector 38 is positioned at the output of the second coil 16. Each photodetector is operable to generate an electrical signal indicative of the optical power of the signal. Although positive intrinsic negative photodiodes (PINs) are presently preferred, it is envisioned that other types of photodetectors are also within the scope of the present invention.

In an uncontrolled mode, EDFA amplifiers are typically operated in the saturated regime, such that the amplifier gain is a decreasing function of the input power and the output power of the amplifier is almost constant. However, in accordance with the present invention, a controller implements an improved optical power transient control scheme. The controller (not shown) receives the electrical signals from each of the photodetectors. In addition, the controller is connected to each of the pump lasers associated with the amplifier. The controller is operable to adjust pump laser current for either pump laser, thereby controlling the optical energy supplied by a given pump laser to a corresponding coil. In this way, the controller electronically controls the total output power and/or total gain of the amplifier. It is envisioned that the controller may be implemented using well known digital signal processing and field programmable gate array techniques that offer high speed accuracy as well as the flexibility of incorporating additional signal processing for further optimization.

Figure 2:
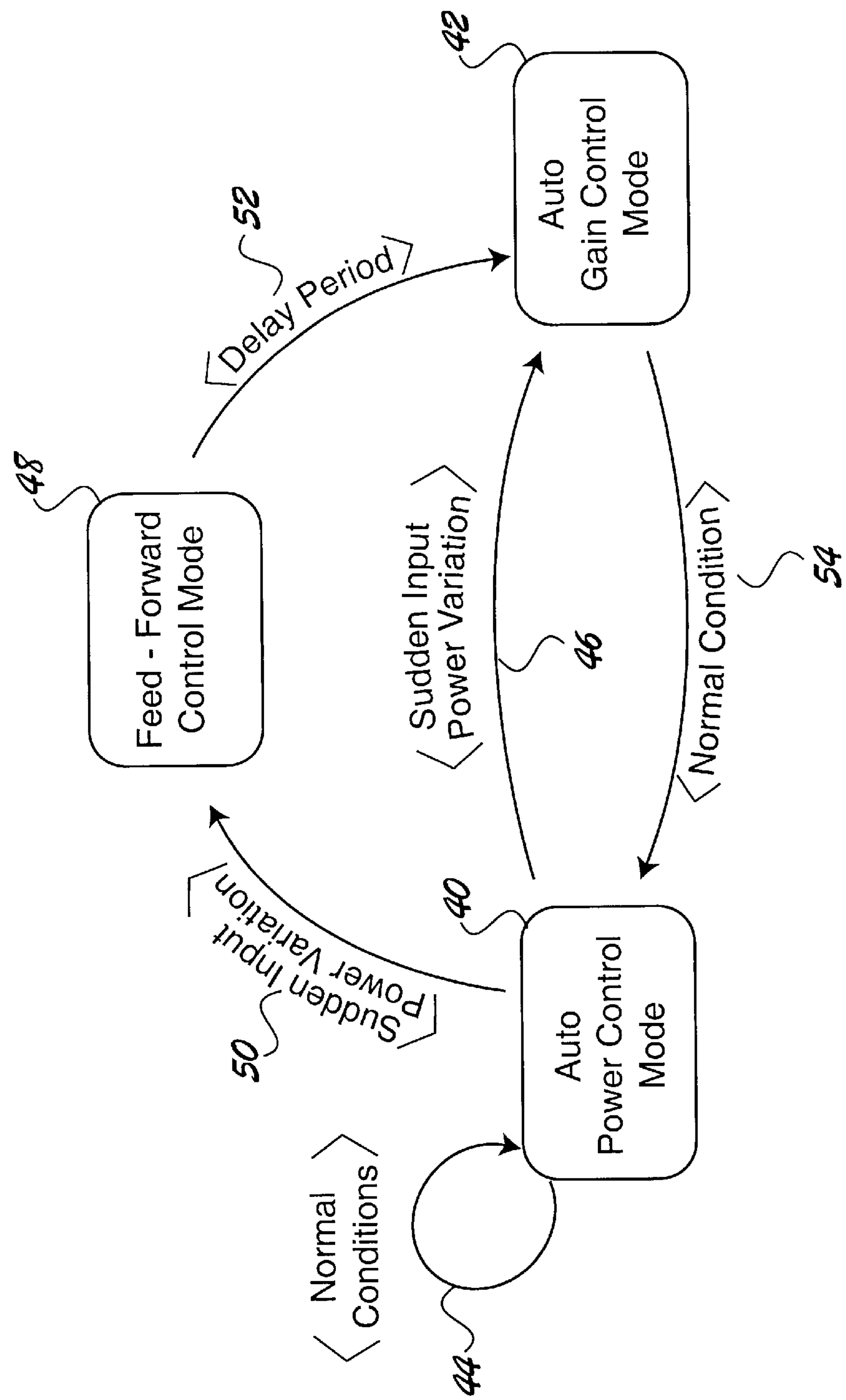
FIG. 2 is a state diagram for an improved optical power transient control scheme in accordance with the present invention.

In accordance with the present invention, the amplifier is operated under an automatic power control mode 40 or an automatic gain control mode 42 as shown in FIG. 2. Under normal operating conditions, the amplifier is in an automatic power control (APC) mode as shown at 44. In the APC mode, the total output power of the amplifier is maintained close to a desired or target output power value using closed-loop feedback control.

The target output power value is computed as the product of the desired power per channel and the number of optical channels present. This computation may be done at either the amplifier level or an overall optical network level. It is to be understood that the actual gain must be within the operational limits of the amplifier gain such that a designed flat gain condition can be maintained. One skilled in the art will readily recognize that this validation may be done directly at the amplifier level through the use of photodetector measurements or at the network level using OSA measurements for individual channel powers.

In operation, the controller receives an electric signal indicative of the output power of the amplifier from the fourth photodetector. A total output power error signal is computed from the target output power value and the actual measured output power of the amplifier. The total output power error signal is then used by the controller to adjust pump laser current supplied by the second pump laser to the second doped fiber section. It is envisioned that the time-constant of this feedback control loop is on the order of 100 ms. In this way, the controller electronically controls the total output power of the amplifier in the APC mode.

The amplifier may also operate under an automatic gain control (AGC) mode 42. In the AGC mode, the total gain of the amplifier is maintained constant under any changes in input power to the amplifier. This type of disturbance rejection control is achieved by adjusting the pump laser current depending on a feedback error between the total measured gain of the amplifier and a reference gain value, where the total measured gain is determined by the ratio of the measured output power of the amplifier and the measured input power of the amplifier.

In operation, the controller receives electric signals from each of the first and fourth photodetector. A total gain error signal is computed from a reference gain value and the total measured gain of the amplifier. The total gain error signal is then used by the controller to adjust pump laser current supplied by the second pump laser to the second coil. It is envisioned that the time-constant of this feedback control loop is on the order of 10 ms. In this way, the controller electronically controls the total gain of the optical amplifier in the AGC mode.

Additionally, the AGC mode may be enhanced by adjusting pump laser current supplied by the second pump laser to the second coil based in part on the measured gain associated with the first coil. To do so, the controller further receives an electric signal from the second photodetector. The controller may then compute a measured gain for the first coil, where the measure gain for first coil is determined by the ratio of the measured output power of the first coil and the measured input power to the first coil. The measure gain for the first coil is combined with a predetermined reference gain value to form the above-noted reference gain value. This reference gain value can then be used to determined the total gain error signal as described above.

In the case of adding/dropping of optical channels, transition from APC mode to AGC mode may be accomplished in a planned way as is known in the art. This is needed such that the total gain of the amplifier is maintained constant and hence the power excursions on the existent optical channels are minimized. However, transition from APC mode to AGC mode may also be triggered by the detection of a sudden drop/increase in the total input power of the amplifier as shown at 46. The sudden drop/increase may be due to an unexpected drop of one or more channels or due to a sudden upstream fiber failure. In any event, the improved optical power transient control scheme 10 of the present invention employs a fast feed-forward transient control mode 48 to detect and respond to such changes.

A fast feed-forward transient control loop is preferably implemented for each coil in the amplifier as shown in FIG. 1. In this example, the controller receives an electrical signal indicative of the optical power at the input of the first coil from the first photodetector as well as an electrical signal indicative of the optical power at the input of the second coil from the third photodetector. The objective of either feed-forward control loop is to quickly detect changes in the input power to a given coil, provide an initial laser pump compensation, and trigger the AGC mode. It is envisioned that the feed-forward control loop will detect changes that occur on the order of 10 us to 10 ms. In response to detecting such a sudden variation in input power, the controller employs a feed-forward control mode as shown at 50. In particular, the controller is operable to adjust the pump laser current, and thereby control pump power. In other words, the controller initially controls the optical power of the amplifier based only on the detected changes in the input power, and without any feedback error control.

After some predetermined time period 52, the controller discontinues the feed-forward control, but continues operation under the AGC mode. It is envisioned that the feed-forward control loop has a time-constant on the order of 10 to 100 us. In a preferred embodiment, the predetermined time period corresponds to this time constant. It is to be understood that some software-implemented mechanism should be implemented to protect against continuous triggering of the AGC mode. For instance, fast feed-forward control should be disabled until the AGC loop settles. Since the AGC mode is already enabled, this is only to avoid sudden step changes on the pump power that may be cause by the feed-forward control process.

During normal operating conditions, the controller will transition back to APC mode as shown at 54. More specifically, the amplifier will remain in the AGC control mode until a valid channel count and output power target is received from a control layer associated with the overall optical network system. After the AGC control loop settles and upon receipt of this valid target, the amplifier can be transition back from the AGC mode to the APC mode. It should be noted that any EDFA card control will operate under targets received from the network system layer with respect to output power per channel and valid channel count, or total output power, respectively. It is envisioned that a valid channel count is going to be determined based on local OSA measurements or received via OSC from an upstream site. The time constant of updating the target for the EDFA card control is very slow compared to its own time constant, i.e., on the order of 1–10 sec. This allows for non-interaction between the two control layers.

The improved optical power transient control scheme of the present invention ensures an optimal partitioning of the time-scale and control action between the feed-forward and feedback mechanisms. In this way, very fast transient detection and appropriate pump laser current adjustment will be achieved. In addition, the feed-forward and feedback control paths are re-configurable online based on the current network configuration which will enable optimized control performance under different DWDM system conditions.

While the invention has been described in its presently preferred form, it will be understood that the invention is capable of modification without departing from the spirit of the invention as set forth in the appended claims.

What is claimed is:

1. A method of electronically controlling an optical amplifier in an optical network, comprising:

controlling the optical amplifier based on output power of an optical signal exiting the amplifier;

detecting a variation in input power of the optical signal entering the optical amplifier;

discontinuing control of the optical amplifier based on the output power in response to the detected variation in input power;

controlling the optical amplifier for a predefined time period based only on the input power of the optical signal discontinuing control of the optical amplifier based only on the input power upon expiration of said predefined time period;

determining an optical gain for the optical amplifier; and controlling the optical amplifier based on the optical gain of the amplifier upon expiration of said predefined time period.

2. The method of claim 1 wherein the step of controlling the optical amplifier for a predefined time period based only on the input power of the optical signal defines a feed-forward control loop having a time constant, said predefined time period being set to on the order of said time constant.

* * * * *